United States Patent [19]

Go et al.

[11] Patent Number: 5,158,847
[45] Date of Patent: Oct. 27, 1992

[54] ELECTROPHOTOGRAPHIC PHOTOSENSITIVE MEMBER COMPRISING AN AZO PIGMENT AS A CHARGE GENERATING MATERIAL

[75] Inventors: Shintetsu Go, Yokohama; Takakazu Tanaka, Machida; Hajime Miyazaki, Yokohama, all of Japan

[73] Assignee: Canon Kabushiki Kaisha, Tokyo, Japan

[21] Appl. No.: 599,638

[22] Filed: Oct. 18, 1990

[30] Foreign Application Priority Data

Oct. 19, 1989 [JP] Japan .................................. 1-270254
Oct. 19, 1989 [JP] Japan .................................. 1-270255
Dec. 8, 1989 [JP] Japan .................................. 1-317587

[51] Int. Cl.⁵ .......................... G03G 5/06; G03G 5/047
[52] U.S. Cl. ........................................ 430/58; 430/59; 430/79
[58] Field of Search .................... 430/58, 59, 72, 73, 430/79, 78; 534/738, 759, 829, 830

[56] References Cited

U.S. PATENT DOCUMENTS

| | | | |
|---|---|---|---|
| 4,268,596 | 5/1991 | Sasaki et al. | 430/58 |
| 4,760,003 | 7/1988 | Matsumoto et al. | 430/58 |
| 4,895,782 | 1/1990 | Koyama et al. | 430/58 |
| 4,963,450 | 10/1990 | Miyazaki et al. | 430/59 |

FOREIGN PATENT DOCUMENTS 53-95033 8/1978 Japan .
54-79632 6/1979 Japan .
57-176033 10/1982 Japan .

*Primary Examiner*—Marion E. McCamish
*Assistant Examiner*—S. Rosasco
*Attorney, Agent, or Firm*—Fitzpatrick, Cella, Harper & Scinto

[57] ABSTRACT

An electrophotographic photosensitive member has a conductive support and a photosensitive layer provided on said conductive support. Said photosensitive layer contains an azo pigment.

7 Claims, 1 Drawing Sheet

ELECTROPHOTOGRAPHIC PHOTOSENSITIVE MEMBER COMPRISING AN AZO PIGMENT AS A CHARGE GENERATING MATERIAL

BACKGROUND OF THE INVENTION

1. Field of the Invention

The present invention relates to an electrophotographic photosensitive member, and more particularly to an electrophotographic photosensitive member having a photosensitive layer containing an azo pigment with a specific structure.

2. Related Background Art

Organic photoconductive materials used in electrophotographic photosensitive members are hitherto known to include photoconductive polymers as typified by poly-N-vinyl carbazole or low-molecular weight organic photoconductive materials such as 2,5-bis(p-diethylaminophenyl)-1,3,4-oxadiazole, and also those comprising a combination of such organic photoconductive material with various sorts of dyes or pigments.

The electrophotographic photosensitive members employing the organic photoconductive materials have the advantages that they can achieve a very high productivity and are inexpensive. They also have the advantages such that the color-sensitivity can be arbitrarily controlled by selecting sensitizers such as dyes or pigments to be used, and thus have been hitherto studied over a wide range. Particularly in recent years, a functionally separated photosensitive member comprising a charge generation layer comprised of an organic photoconductive dye or pigment, laminated with a charge transport layer comprised of the above photoconductive polymer or low molecular organic photoconductive material, has been developed to bring about remarkable improvement in the sensitivity and durability in which the conventional organic electrophotographic photosensitive members have been regarded as defective.

Among the organic photoconductive materials, many of azo pigments are commonly capable of showing superior photoconductivity. Moreover, pigment compounds with a variety of properties can be relatively readily obtained since the properties of pigments can be controlled depending on the manner by which an azo component and a coupler component are combined. Thus, a large number of pigments have been hitherto proposed.

As couplers used in such azo pigments, the Naphthol AS compounds as disclosed in Japanese Patent Application Laid-open No. 47-375438, etc., the benzcarbazole compounds as disclosed in Japanese Patent Application Laid-open No. 53-95033, etc., the naphthalimide compounds as disclosed in Japanese Patent Application Laid-open No. 54-79632, and the perylene compounds as disclosed in Japanese Patent Application Laid-open No. 57-176055 are already known in the art.

The electrophotographic photosensitive members that use conventional azo pigments, however, can not necessarily be said to be satisfactory in view of sensitivity, or potential stability when repeatedly used, and only a few materials have been put into practical use.

SUMMARY OF THE INVENTION

An object of the present invention is to provide an electrophotographic photosensitive member having a high sensitivity and also having stable potential characteristics even when repeatedly used.

The present invention provides an electrophotographic photosensitive member comprising a conductive support and a photosensitive layer provided on said conductive support, wherein said photosensitive layer contains an azo pigment represented by the following Formula (1), Formula:

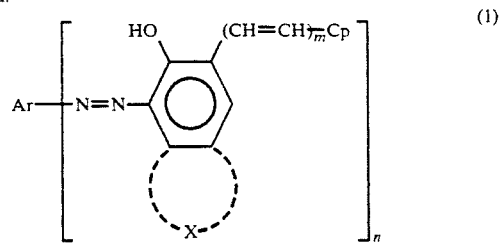
(1)

wherein Ar represents an aromatic hydrocarbon group which may be bonded through a bonding group and may have a substituent, or a heterocyclic group which may be bonded through a bonding group and may have a substituent; X represents a residual group necessary to complete upon condensation with the benzene ring an aromatic hydrocarbon ring which may have a substituent or an aromatic heterocyclic ring which may have a substituent; Cp represents the following Formula (2), (3) or (4), Formula:

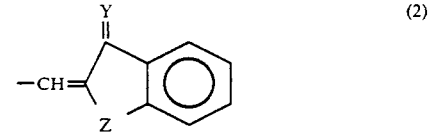
(2)

wherein Y represents an oxygen atom, a sulfur atom or a dicyanomethylene group; and Z represents an imino group, a sulfinyl group or a sulfonyl group, Formula:

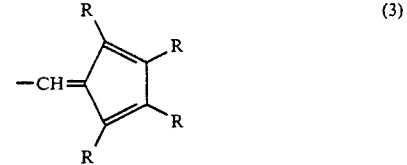
(3)

wherein R represents an alkyl group or an aryl group,

Formula:

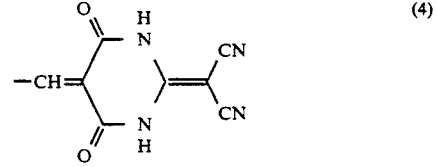
(4)

and m is an integer of 0 or 1, and n is an integer of 1, 2 or 3.

DESCRIPTION OF THE PREFERRED EMBODIMENTS

Figure 1:
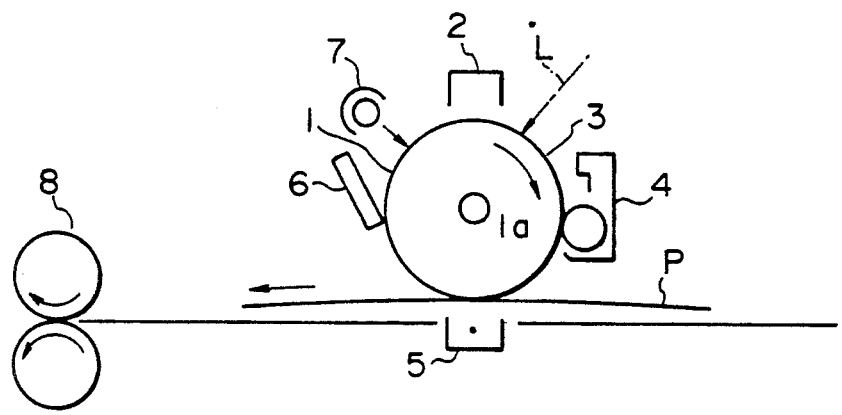
FIG. 1 schematically illustrates an example of the constitution of an electrophotographic apparatus in which the electrophotographic photosensitive member of the present invention is used.

The present invention is an electrophotographic photosensitive member having a photosensitive layer containing the azo pigment represented by Formula (1) as described above.

In Formula (1), the group represented by Ar includes aromatic hydrocarbon groups such as benzene, naphthalene, fluorene, phenanthrene, anthracene, and pyrene; heterocyclic groups such as furan, thiophene, pyridine, indole, benzothiazole, carbazole, acridone, benzothiophene, benzoxazole, oxadiazole, and thiazole; and the above aromatic hydrocarbon groups or heterocyclic groups which are mutually bonded directly or through an aromatic group or non-aromatic group, as exemplified by groups such as biphenyl, binaphthyl, diphenylamine, triphenylamine, N-methyldiphenylamine, fluorenone, phenanthrenequinone, anthraquinone, benzanthrone, terphenyl, diphenyloxadiazole, stilbene, distyrylbenzene, phenylbenzoxazole, diphenylmethane, diphenylsulfone, diphenyl ether, benzophenone, tetraphenyl-p-phenylenediamine, tetraphenylbenzidine, N-phenyl-2-pyridylamine, and N,N-diphenyl-2-pyridylamine.

The group represented by X includes residual groups necessary to complete upon condensation with the benzene ring an aromatic hydrocarbon ring such as naphthalene or anthracene or a heterocyclic ring such as indole, carbazole, benzcarbazole or benzofuran.

The substituent the above aromatic hydrocarbon group or heterocyclic group may have, includes alkyl groups such as methyl, ethyl, propyl, and butyl; alkoxy groups such as methoxy, ethoxy, and propoxy; halogen atoms such as a fluorine atom, a chlorine atom and a bromine atom; dialkylamino groups such as dimethylamino, and diethylamino; a hydroxyl group, a nitro group, a cyano group, and a halomethyl group.

In Formula (2), Y represents an oxygen atom, a sulfur atom or a dicyanomethylene group; and Z represents an imino group, a sulfinyl group or a sulfonyl group.

The group represented by R in Formula (3) includes alkyl groups such as methyl and ethyl, and aryl groups such as phenyl.

Examples of the azo pigment used in the present invention are shown below. As a matter of course, the azo pigment used in the present invention is by no means limited to these.

In the following, the structural formulas are each set forth by giving a basic formula and its variations.

Basic formula 1:

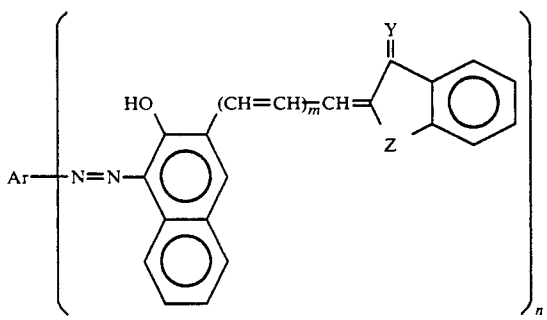

Exemplary pigment (1-1)

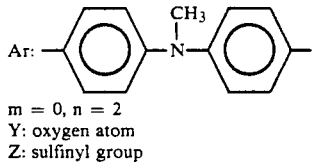

m = 0, n = 2
Y: oxygen atom
Z: sulfinyl group

Exemplary pigment (1-2)

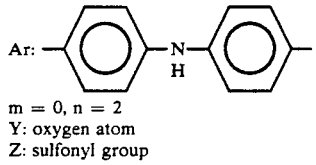

m = 0, n = 2
Y: oxygen atom
Z: sulfonyl group

Exemplary pigment (1-3)

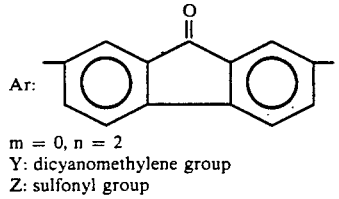

m = 0, n = 2
Y: dicyanomethylene group
Z: sulfonyl group

-continued
Exemplary pigment (1-4)
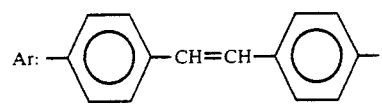
m = 1, n = 2
Y: dicyanomethylene group
Z: imino group
Exemplary pigment (1-5)
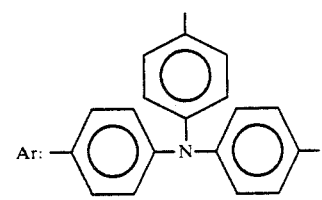
m = 0, n = 3
Y: oxygen atom
Z: sulfonyl group
Exemplary pigment (1-6)
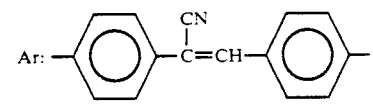
m = 1, n = 2
Y: oxygen atom
Z: sulfonyl group
Exemplary pigment (1-7)
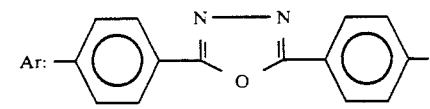
m = 0, n = 2
Y: dicyanomethylene group
Z: sulfonyl group
Basic formula 2:
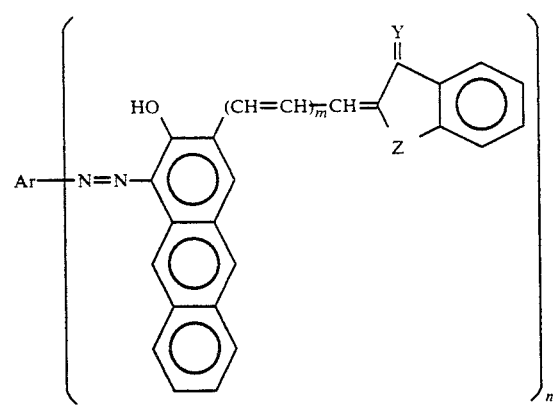
Exemplary pigment (2-1)
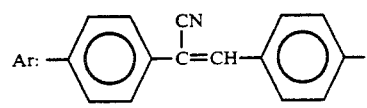
m = 0, n = 2
Y: oxygen atom
Z: sulfonyl group
Exemplary pigment (2-2)

Ar: 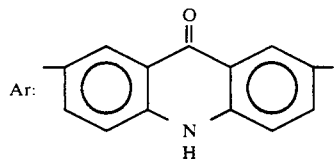
m = 0, n = 2
Y: dicyanomethylene group
Z: sulfonyl group
Exemplary pigment (2-3)
Ar: 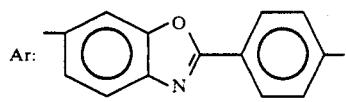
m = 1, n = 2
Y: dicyanomethylene group
Z: imino group
Exemplary pigment (2-4)
Ar: 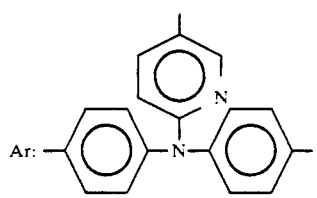
m = 0, n = 3
Y: oxygen atom
Z: sulfonyl group
Exemplary pigment (2-5)
Ar: 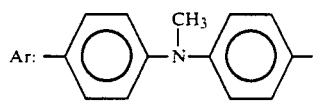
m = 1, n = 2
Y: dicyanomethylene group
Z: sulfonyl group
Basic formula 3:
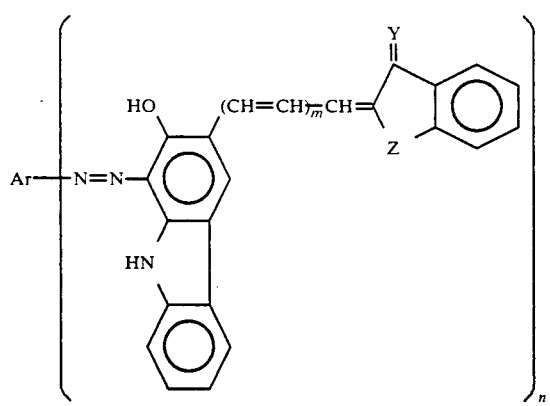
Exemplary pigment (3-1)
Ar: 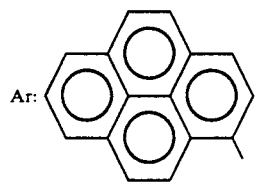
m = 0, n = 1
Y: oxygen atom
Z: sulfinyl group
Exemplary pigment (3-2)

-continued
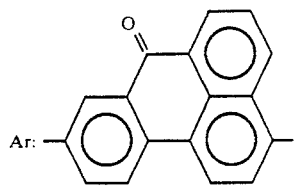
m = 0, n = 2
Y: dicyanomethylene group
Z: sulfonyl group
Exemplary pigment (3-3)
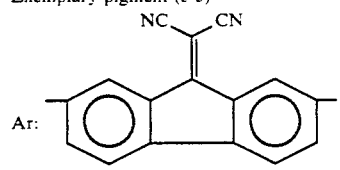
m = 0, n = 2
Y: dicyanomethylene group
Z: imino group
Exemplary pigment (3-4)
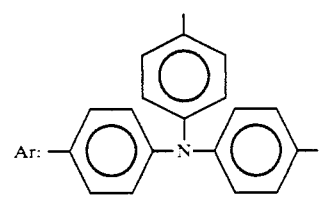
m = 0, n = 3
Y: dicyanomethylene group
Z: sulfonyl group
Basic formula 4:
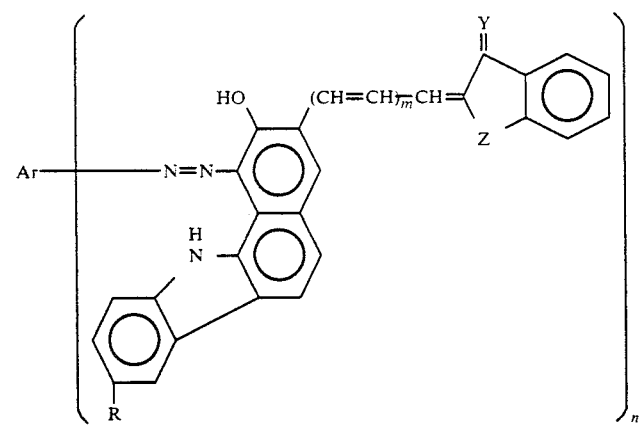
Exemplary pigment (4-1)
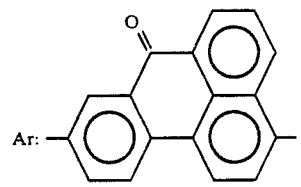
m = 0, n = 2
R: hydrogen atom
Y: oxygen atom
Z: sulfinyl group
Exemplary pigment (4-2)

-continued

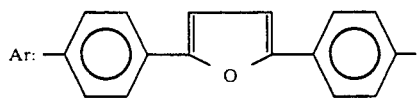
m = 1, n = 2
R: hydrogen atom
Y: dicyanomethylene group
Z: sulfonyl group Exemplary pigment (4-3)

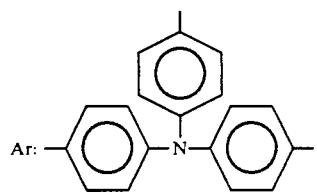
m = 0, n = 3
R: fluorine atom
Y: oxygen atom
Z: imino group

Exemplary pigment (4-4)

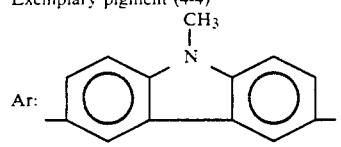
m = 1, n = 2
R: fluorine atom
Y: dicyanomethylene group
Z: sulfonyl group Exemplary pigment (4-5)

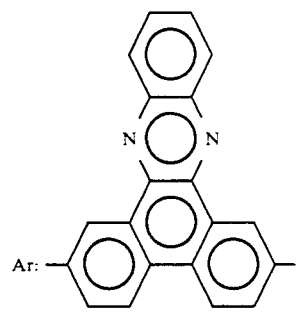
m = 0, n = 2
R: chlorine atom
Y: dicyanomethylene group
Z: sulfonyl group Exemplary pigment (4-6)

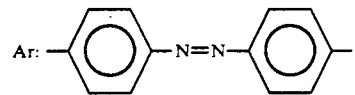
m = 1, n = 2
R: chlorine atom
Y: dicyanomethylene group
Z: sulfonyl group Exemplary pigment (4-7)

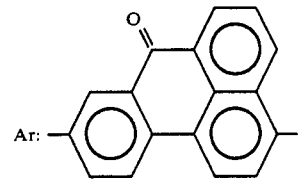
m = 0, n = 2
R: chlorine atom
Y: oxygen atom

Z: sulfonyl group
Exemplary pigment (4-8)
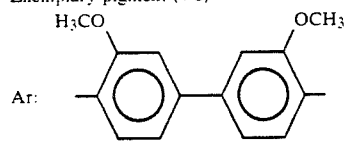
m = 0, n = 2
R: bromine atom
Y: dicyanomethylene group
Z: sulfonyl group
Exemplary pigment (4-9)
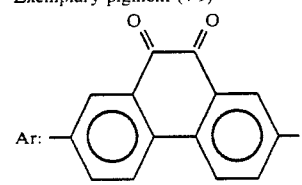
m = 0, n = 2
R: methyl group
Y: oxygen atom
Z: imino group
Basic formula 5:
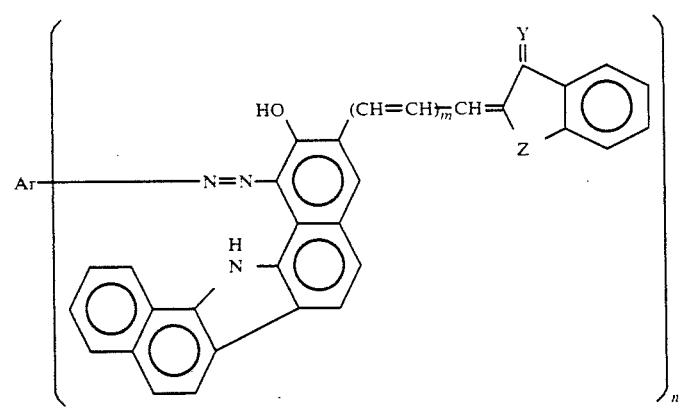
Exemplary pigment (5-1)
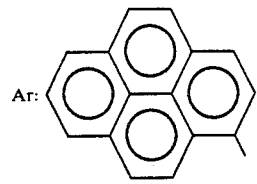
m = 1, n = 1
Y: oxygen atom
Z: sulfonyl group
Exemplary pigment (5-2)
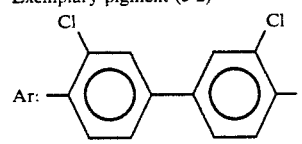
m = 0, n = 2
Y: dicyanomethylene group
Z: sulfonyl group
Basic formula 6:

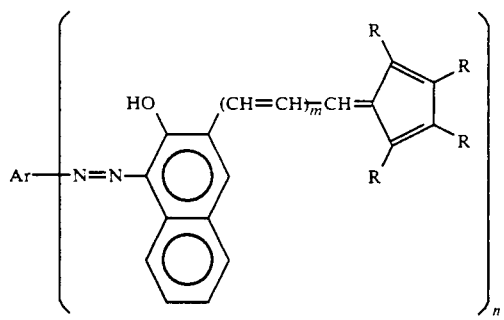
Exemplary pigment (6-1)
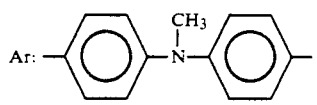
m = 0, n = 2
R: phenyl group
Exemplary pigment (6-2)
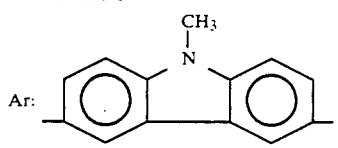
m = 0, n = 2
R: phenyl group
Exemplary pigment (6-3)
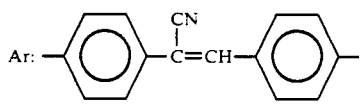
m = 1, n = 2
R: phenyl group
Exemplary pigment (6-4)
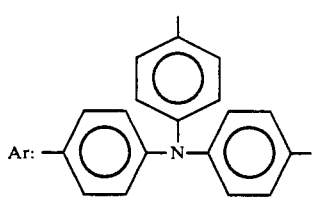
m = 0, n = 3
R: phenyl group
Exemplary pigment (6-5)
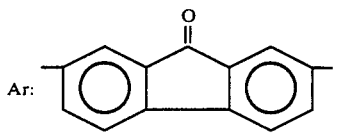
m = 0, n = 2
R: methyl group
Basic formula 7:

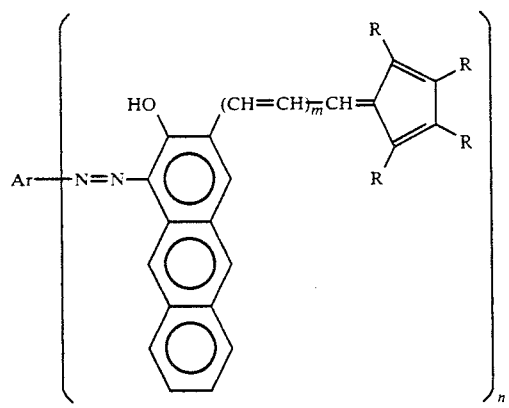
Exemplary pigment (7-1)
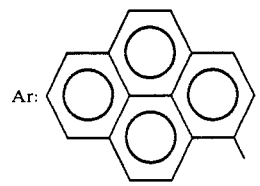
m = 0, n = 1
R: methyl group
Exemplary pigment (7-2)
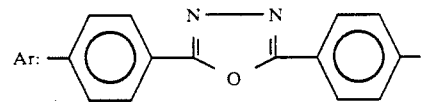
m = 1, n = 2
R: phenyl group
Exemplary pigment (7-3)
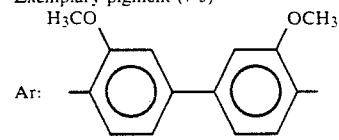
m = 0, n = 2
R: phenyl group
Basic formula 8:
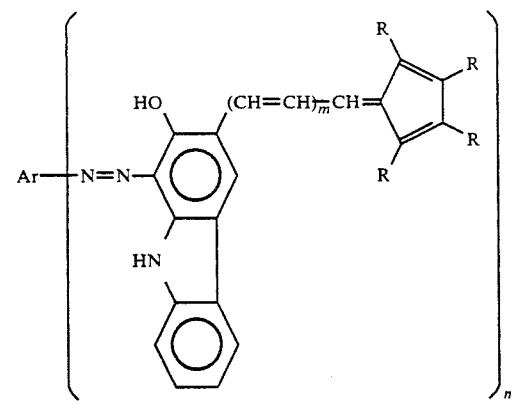
Exemplary pigment (8-1)
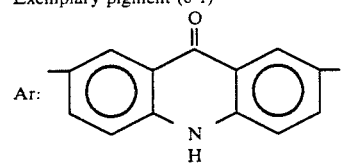

m = 0, n = 2
R: phenyl group
Exemplary pigment (8-2)
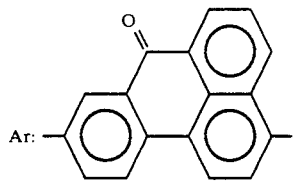
m = 1, n = 2
R: phenyl group
Exemplary pigment (8-3)
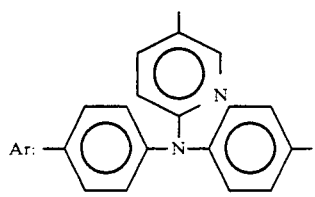
m = 0, n = 3
R: phenyl group
Basic formula 9:
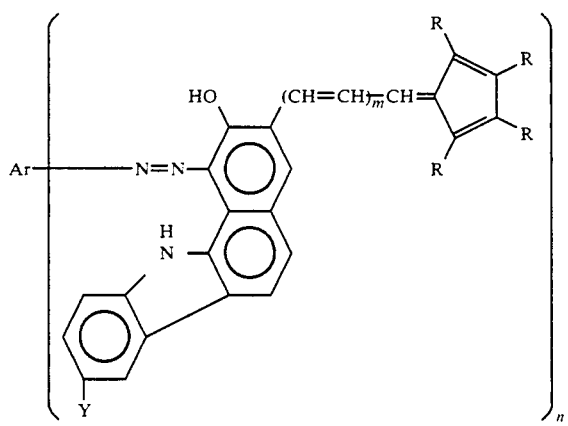
Exemplary pigment (9-1)
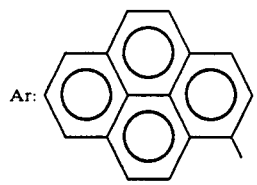
m = 0, n = 1
R: phenyl group
Y: hydrogen atom
Exemplary pigment (9-2)
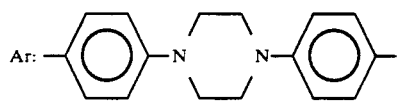
m = 0, n = 2
R: methyl group
Y: chlorine atom
Exemplary pigment (9-3)

-continued
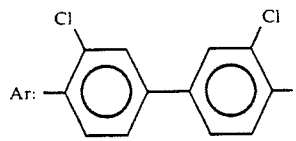
m = 1, n = 2
R: phenyl group
Y: hydrogen atom
Exemplary pigment (9-4)
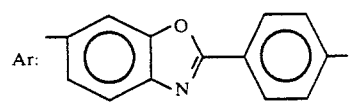
m = 0, n = 2
R: phenyl group
Y: bromine atom
Exemplary pigment (9-5)
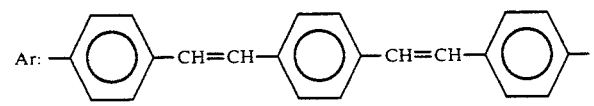
m = 0, n = 2
R: phenyl group
Y: flourine atom
Basic formula 10:
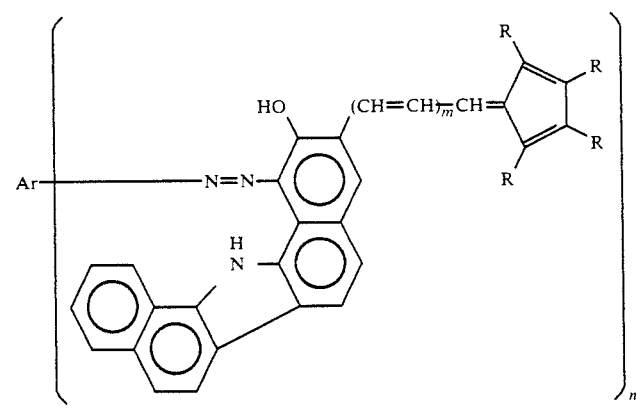
Exemplary pigment (10-1)
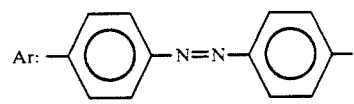
m = 0, n = 2
R: phenyl group
Exemplary pigment (10-2)
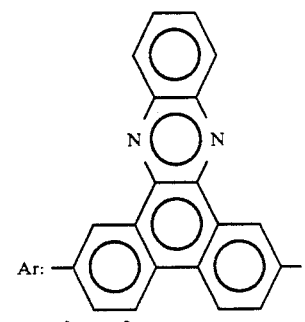
m = 0, n = 2
R: phenyl group
Basic formula 11:

-continued
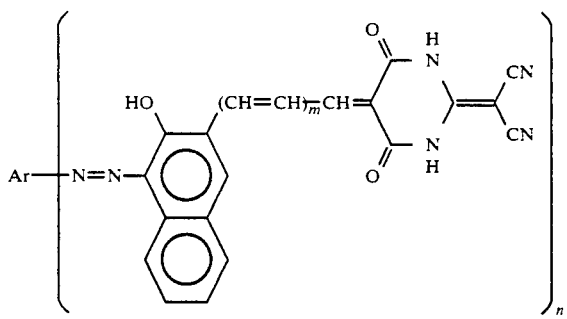
Exemplary pigment (11-1)
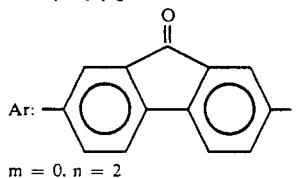
m = 0, n = 2
Exemplary pigment (11-2)
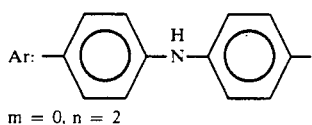
m = 0, n = 2
Exemplary pigment (11-3)
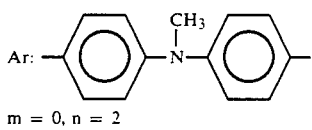
m = 0, n = 2
Exemplary pigment (11-4)
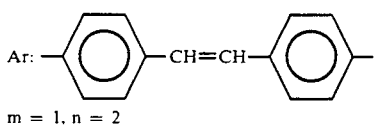
m = 1, n = 2
Exemplary pigment (11-5)
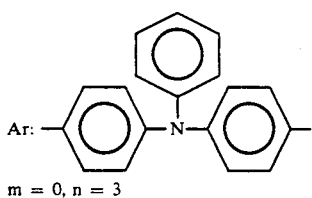
m = 0, n = 3
Exemplary pigment (11-6)
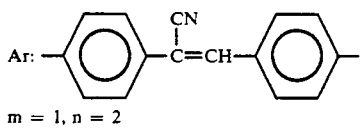
m = 1, n = 2
Exemplary pigment (11-7)
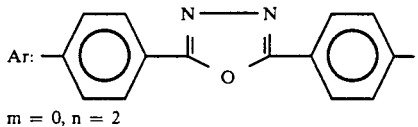
m = 0, n = 2
Exemplary pigment (11-8)

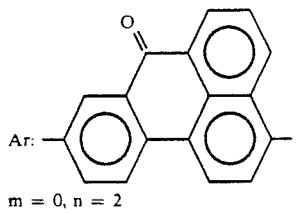
m = 0, n = 2
Basic formula 12:
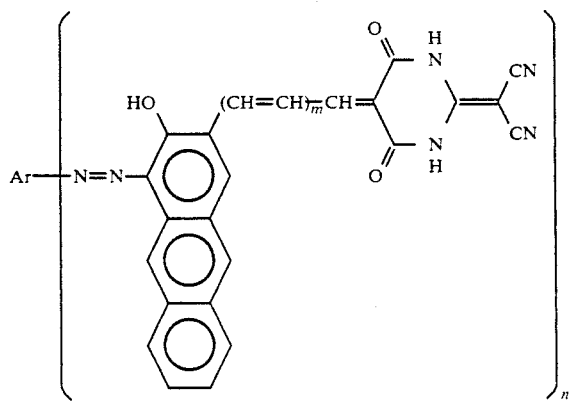
Exemplary pigment (12-1)
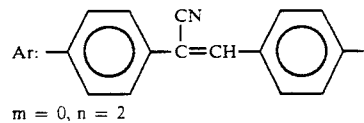
m = 0, n = 2
Exemplary pigment (12-2)
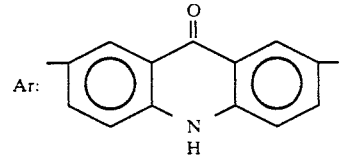
m = 0, n = 2
Exemplary pigment (12-3)
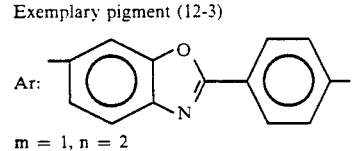
m = 1, n = 2
Exemplary pigment (12-4)
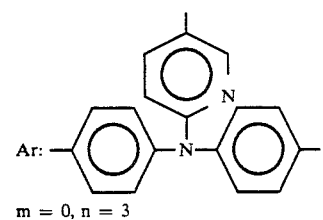
m = 0, n = 3
Exemplary pigment (12-5)
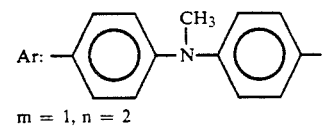
m = 1, n = 2
Basic formula 13:

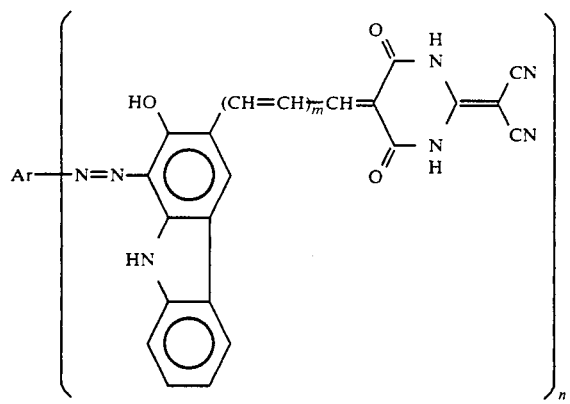
Exemplary pigment (13-1)
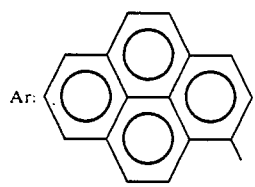
m = 0, n = 1
Exemplary pigment (13-2)
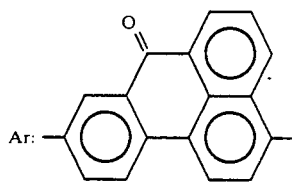
m = 0, n = 2
Exemplary pigment (13-3)
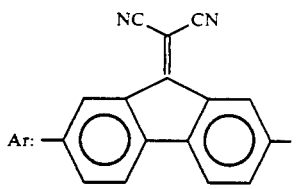
m = 0, n = 2
Exemplary pigment (13-4)
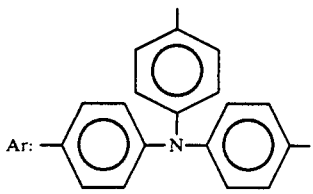
m = 0, n = 3
Basic formula 14:

-continued
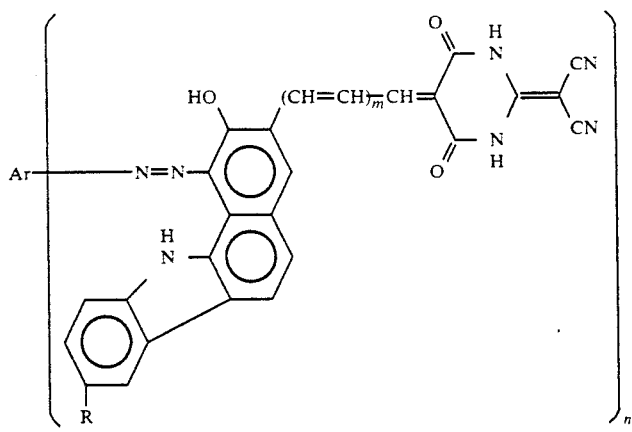
Exemplary pigment (14-1)
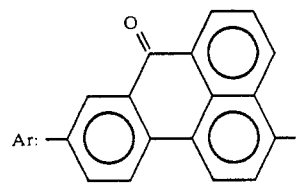
m = 0, n = 2
R: hydrogen atom
Exemplary pigment (14-2)
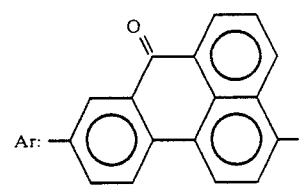
m = 0, n = 2
R: chlorine atom
Exemplary pigment (14-3)
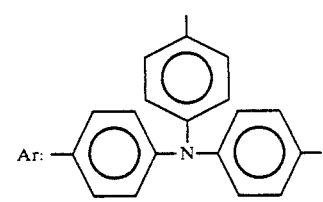
m = 0, n = 3
R: fluorine atom
Exemplary pigment (14-4)
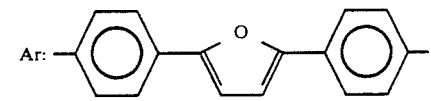
m = 1, n = 2
R: hydrogen atom
Exemplary pigment (14-5)
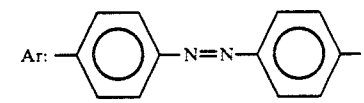
m = 0, n = 2
R: hydrogen atom
Exemplary pigment (14-6)

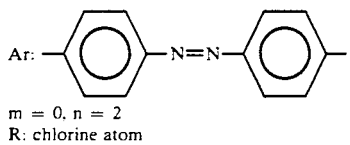
Ar:
m = 0, n = 2
R: chlorine atom
Exemplary pigment (14-7)
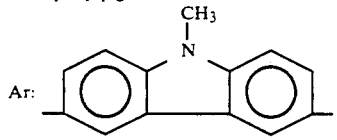
Ar:
m = 0, n = 2
R: flourine atom
Exemplary pigment (14-8)
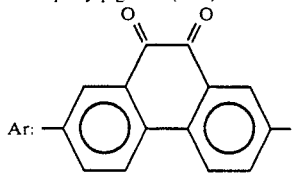
Ar:
m = 0, n = 2
R: methyl group
Exemplary pigment (14-9)
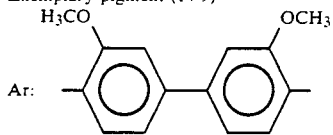
Ar:
m = 0, n = 2
R: bromine group
Exemplary pigment (14-10)
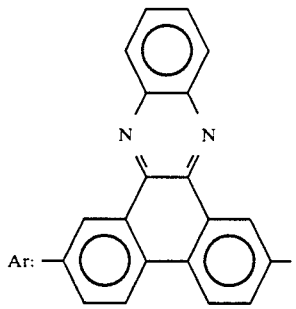
Ar:
m = 0, n = 2
R: chlorine atom
Basic formula 15:
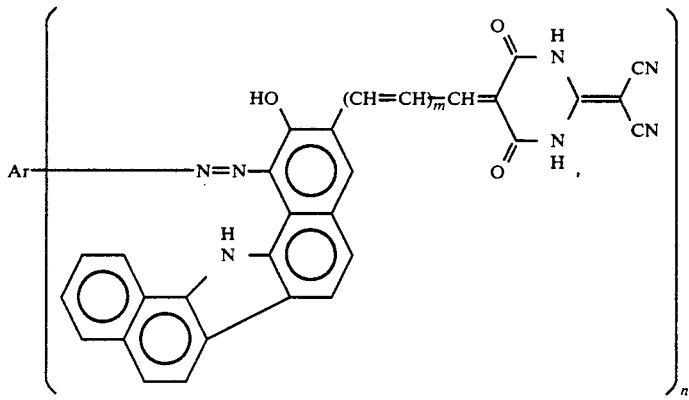
Exemplary pigment (15-1)

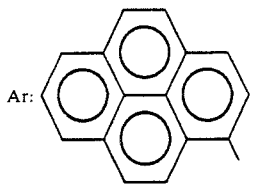

m = 1, n = 1

Exemplary pigment (15-2)

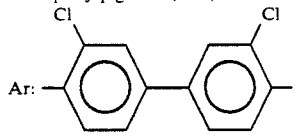

m = 0, n = 2

SYNTHESIS EXAMPLE

Synthesis of exemplary pigment (1-2)

In 300 ml of a beaker, 150 ml of water, 20 ml (0.23 mol) of concentrated hydrochloric acid and 5.4 g (0.032 mol) of diphenylamine were put, and the solution was cooled to 0° C., to which a solution obtained by dissolving 4.6 g (0.067 mol) of sodium nitrite in 10 ml of water was dropwise added in 10 minutes while its liquid temperature was kept at 5° C. or less. After stirring for 15 minutes, the reaction mixture was filtered, and then a solution obtained by dissolving 10.5 g (0.096 mol) of sodium borofluoride in 90 ml of water was dropwise added in the reaction mixture with stirring. The borofluoride which precipitated was collected by filtration, and then washed with cold water, followed by washing with acetonitrile and then drying at room temperature under reduced pressure to give a borofluoride. Yield: 8.3 g, 65%.

In a 500 ml flask, 5.0 g (0.029 mol) of 3-formyl-2-naphthol, 5.8 g (0.032 mol) of a 2,3-dihydrothiophene-1,1-dioxide derivative and 300 ml of ethanol were introduced, and the contents were refluxed while heating for about 1 hour.

After cooling, the precipitates were collected by filtration, and then washed with ethanol four times while heating to give a compound. Yield: 8.9 g, 91.3%.

Next, in a one liter beaker, 500 ml of N,N-dimethylformamide (DMF) was added, and then 7.0 g (0.021 mol) of the compound previously obtained was dissolved therein. The resulting solution was cooled to have a liquid temperature of 5° C. Thereafter, 4.0 g (0.010 mol) of the borofluoride previously obtained was dissolved therein and subsequently 2.6 g (0.026 mol) of triethylamine was dropwise added in 5 minutes. After stirring for 2 hours, a pigment which precipitated was collected by filtration, and then washed with DMF four times and with water three times, followed by freeze-drying. Yield: 6.1 g, 68%.

The electrophotographic photosensitive member of the present invention comprises a conductive support having thereon a photosensitive layer containing the azo pigment represented by Formula (1).

The photosensitive layer may have any known form. Particularly preferred is a photosensitive layer of what is called the function-separated type, comprised of the photosensitive layer containing the azo pigment represented by Formula (1) that serves as a charge generation layer, and a charge transport layer laminated thereon containing a charge-transporting material.

The charge generation layer can be formed by coating on a conductive support by a known method a coating solution prepared by dispersing the above azo pigment in a suitable solvent together with a binder resin. The layer may preferably have a coating thickness of not more than 5 μm, and particularly preferably from 0.1 to 1.3 μm.

The crystal form of the azo pigment represented by Formula (1), used in the present invention, may be either crystalline or amorphous. If necessary, the azo pigment represented by Formula (1) may be used in combination of two or more kinds, or in combination with other known charge-generating material.

The binder resin usable in the charge generation layer can be selected from a vast range of insulating resins or organic photoconductive polymers. It may preferably include polyvinyl butyral, polyvinyl benzal, polyarylates, polycarbonates, polyesters, phenoxy resins, cellulose resins, acrylic resins, and polyurethanes. It may be used in an amount of not more than 80 parts by weight, and preferably not more than 40 parts by weight, as the content in the charge generation layer.

The solvent used when the azo pigment is dispersed may preferably be selected from those which may not dissolve the charge transport layer and the subbing layer described later.

Examples thereof are ethers such as tetrahydrofuran and 1,4-dioxane, ketones such as cyclohexanone and methyl ethyl ketone, amides such as N,N-dimethylformamide, esters such as methyl acetate and ethyl acetate, aromatics such as toluene, xylene and chlorobenzene, alcohols such as methanol, ethanol and 2-propanol, and aliphatic halogenated hydrocarbons such as chloroform, methylene chloride, dichloroethylene, carbon tetrachloride and trichloroethylene.

The charge transport layer is laminated on or beneath the charge generation layer, and has the function of receiving charge carriers from the charge generation layer in the presence of an electric field to transport them.

The charge transport layer can be formed by coating a coating solution prepared by dissolving a charge-transporting material in a solvent optionally together with a suitable binder resin. It may preferably have a coating thickness of from 5 to 40 μm, and particularly preferably from 15 to 30 μm.

The charge-transporting material includes an electron transporting material and a positive-hole transporting material. The electron transporting material includes electron attractive materials as exemplified by 2,4,7-trinitrofluorenone, 2,4,5,7-tetranitrofluorenone, chloranil, and tetracyanoquinodimethane, or those obtained by forming these electron attractive materials into high molecular weight materials.

The positive-hole transporting material includes polycyclic aromatic compounds such as pyrene and anthracene, heterocyclic compounds such as compounds of a carbazole type, an indole type, an imidazole type, an oxazole type, a thiazole type, an oxathiazole type, a pyrazole type, a pyrazoline type, a thiazole type or a triazole type, hydrazone compounds such as p-diethylaminobenzaldehyde-N,N-diphenylhydrazone and N,N-diphenylhydrazino-3-methylidene-9-ethylcarbazole, styryl compounds such as α-phenyl-4'-N,N-diphenylaminostilbene and 5-[4-(di-p-tolylamino)benzilidene]-5H-dibenzo[a,d]cycloheptene, benzidine compounds, triarylmethane compounds, triphenylamine, or polymers having a group comprising any of these compounds as a backbone chain or side chain as exemplified by poly-N-vinylcarbazole and polyvinylanthracene.

In addition to these organic charge-transporting materials, it is also possible to use inorganic materials such as selenium, selenium-tellurium, amorphous silicon and cadmium sulfide.

These charge-transporting materials can be used alone or in combination of two or more kinds.

The binder resin that may be used in the charge transport layer includes insulating resins such as acrylic resins, polyarylates, polyesters, polycarbonates, polystyrene, an acrylontrile/styrene copolymer, polyacrylamides, polyamides and chlorinated rubbers, and organic photoconductive polymers such as poly-N-vinylcarbazole and polyvinylanthracene.

As another embodiment of the present invention, the electrophotographic photosensitive member can be what is called the single-layer electrophotographic photosensitive member in which the azo pigment represented by Formula (1) and the charge-transporting material are incorporated in the same layer. In this instance, a charge-transfer complex comprised of poly-N-vinylcarbazole and trinitrofluorenone can be used as the charge-transporting material.

The electrophotographic photosensitive member of this embodiment can be formed by coating a solution prepared by dissolving the above azo pigment and the charge-transfer complex in a suitable resin solution.

The conductive support used in the present invention are exemplified by those made of aluminum, an aluminum alloy, copper, zinc, stainless steel, titanium, nickel, indium, gold, platinum or the like. Besides these, it is also possible to use plastics (as exemplified by polyethylene, polypropylene, polyvinyl chloride, polyethylene terephthalate and acrylic resins) having a layer formed into a film by vacuum deposition of any of these metals or alloys, supports comprising any of the above metals or plastics covered thereon with conductive particles (as exemplified by carbon black and silver particles) together with a suitable binder, and supports comprising plastics or paper impregnated with the conductive particles.

A subbing layer having a barrier function and an adhesion function may be provided between the conductive support and the photosensitive layer.

The subbing layer can be formed using casein, polyvinyl alcohol, nitrocellulose, polyamides (such as nylon 6, nylon 66, nylon 610, copolymer nylon and alkoxymethylated nylon), polyurethanes, aluminum oxide, etc.

The subbing layer may suitably have a film thickness of not more than 5 μm, preferably from 0.5 μm to 3 μm.

In the present invention, it is also possible to provide on the photosensitive layer a protective layer formed of a resin layer or a resin layer in which conductive particles are dispersed.

The electrophotographic photosensitive member of the present invention can be not only utilized in electrophotographic copying machines, but also widely used in the field in which the electrophotography is applied as exemplified by facsimiles, laser beam printers, CRT printers, LED printers, liquid crystal printers and laser beam engravers.

FIG. 1 schematically illustrates an example of the constitution of a commonly available transfer electrophotographic apparatus in which the electrophotographic photosensitive member of the present invention is used.

In FIG. 1, the numeral 1 denotes a drum photosensitive member serving as an image supporting member, which is rotated around a shaft 1a at a given peripheral speed in the direction shown by the arrow. In the course of rotation, the photosensitive member 1 is uniformly charged on its periphery, with positive or negative given potential by the operation of a charging means 2, and then photoimagewise exposed to light L (slit exposure, laser beam scanning exposure, etc.) at an exposure area 3 by the operation of an imagewise exposure means (not shown). As a result, electrostatic latent images corresponding to the exposure images are successively formed on the periphery of the photosensitive member.

The electrostatic latent images thus formed are subsequently developed by toner by the operation of a developing means 4. The resulting toner-developed images are then successively transferred by the operation of a transfer means 5, to the surface of a transfer medium P fed from a paper feed section (not shown) to the part between the photosensitive member 1 and the transfer means 5 in the manner synchronized with the rotation of the photosensitive member 1.

The transfer medium P on which the images have been transferred is separated from the surface of the photosensitive member and led through an image-fixing means 8, where the images are fixed and then delivered to the outside as a transcript (a copy).

The surface of the photosensitive member 1 after the transfer of images is brought to removal of the toner remaining after the transfer, using a cleaning means 6. Thus the photosensitive member is cleaned on its surface. Further, the charges remaining thereon is eliminated by the operation of a pre-exposure means 7. The photosensitive member is then repeatedly used for the formation of images.

The charging means 2 for giving uniform charge on the photosensitive member 1 include corona chargers, which are commonly put into wide use. As the transfer means 5, corona transfer units are also commonly put into wide use.

The electrophotographic apparatus may be constituted of a combination of plural components joined as one device unit from among the constituents such as the above photosensitive member, developing means and cleaning means so that the unit can be freely mounted on or detached from the body of the apparatus. For example, at least one of the charging means, the developing means and the cleaning means may be held into one unit together with the photosensitive member so that the unit can be freely mounted or detached using a guide means such as a rail provided in the body of the apparatus. Here, the above device unit may be so constituted as to be joined together with the charge means and/or the developing means.

In the case when the electrophotographic apparatus is used as a copying machine or a printer, optical image exposing is performed by light reflected from, or transmitted through, an original. Or, when the original itself is read and converted to a signal, according to which signal the scanning of a laser beam, driving of an LED array, or driving of a liquid crystal shutter array is performed, thereby effecting the optical image exposing.

Figure 2:
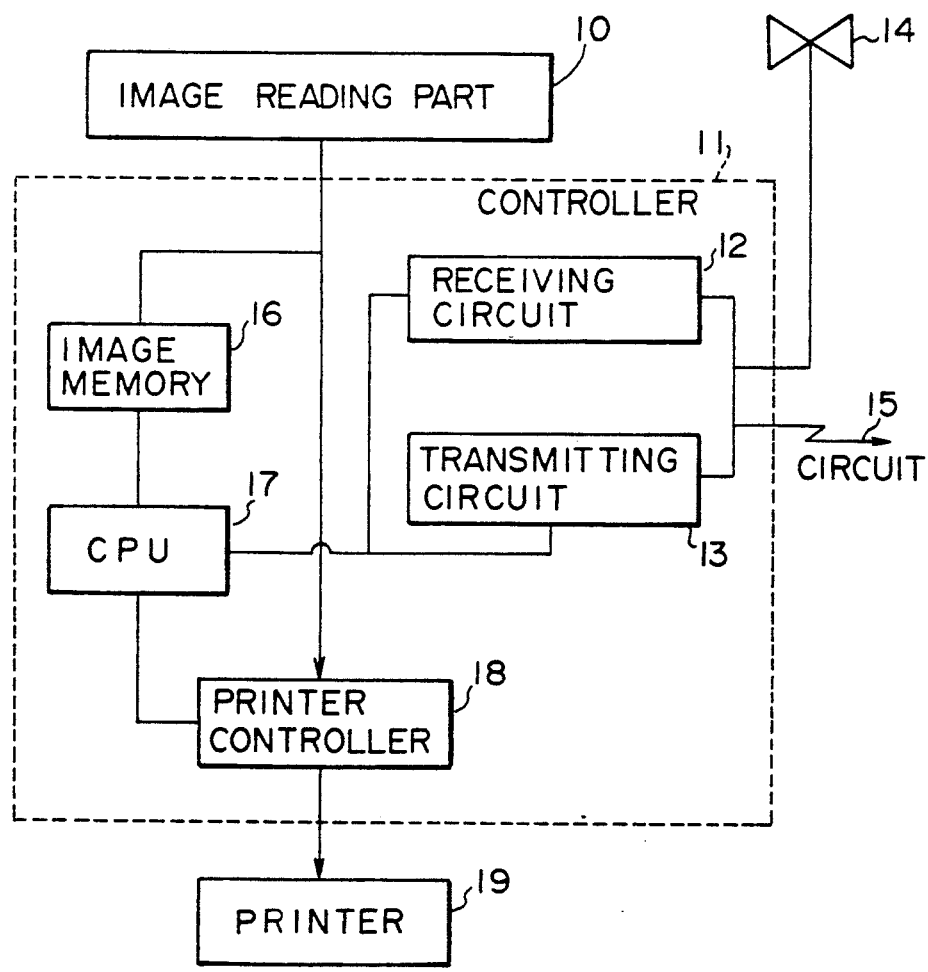
FIG. 2 is a block diagram of a facsimile machine in which an electrophotographic apparatus comprised of the electrophotographic photosensitive member of the present invention is used.

When used as a printer of a facsimile machine, the optical image exposing light L serves as exposing light used for the printing of received data. FIG. 2 illustrates an example thereof in the form of a block diagram.

In FIG. 2, a controller 11 controls an image reading part 10 and a printer 19. The whole of the controller 11 is controlled by CPU 17. Image data outputted from the image reading part is sent to the other facsimile station through a transmitting circuit 13. Data received from the other station is sent to a printer 19 through a receiving circuit 12. Given image data are stored in an image memory 16. A printer controller 18 controls the printer 19. The numeral 14 denotes a telephone.

An image received from a circuit 15 (image information from a remote terminal connected through the circuit) is demodulated in the receiving circuit 12, and then successively stored in an image memory 16 after the image information is decoded by the CPU 17. Then, when images for at least one page have been stored in the memory 16, the image recording for that page is carried out. The CPU 17 reads out the image information for one page from the memory 16 and sends the coded image information for one page to the printer controller 18. The printer controller 18, having received the image information for one page from the CPU 17, controls the printer 19 so that the image information for one page is recorded.

The CPU 17 receives image information for next page in the course of the recording by the printer 19.

Images are received and recorded in the above way.

EXAMPLES 1 TO 58

To an aluminum support, a solution prepared by dissolving 5 g of methoxymethylated nylon (number average molecular weight: 32,000) and 10 g of alcoholsoluble copolymer nylon (number average molecular weight: 29,000) in 95 g of methanol was applied by Meyer bar coating to provide a subbing layer of 1 μm in a dry coating thickness.

Next, 5 g of the exemplary pigment (1-2) was added to a solution prepared by 2 g of a butyral resin (degree of butyralization: 63 mol %) in 95 ml of cyclohexanone, followed by dispersion for 20 hours using a sand mill. The resulting dispersion was applied onto the subbing layer previously formed, by Meyer bar coating so as to have a dry coating thickness of 0.2 μm, followed by drying to form a charge generation layer.

Next, 5 g of a hydrazine compound with the following structural formula:

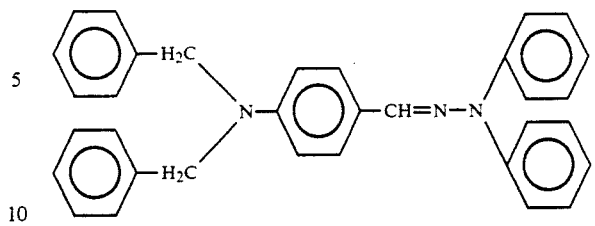

and 5 g of polymethyl methacrylate (number average molecular weight: 100,000) were dissolved in 40 ml of chlorobenzene, and the resulting solution was applied onto the charge generation layer by Meyer bar coating so as to have a dry coating thickness of 20 μm, followed by drying to form a charge transport layer. An electrophotographic photosensitive member of Example 1 was thus prepared.

Electrophotographic photosensitive members were prepared in the same manner as in Example 1 except that the exemplary pigment (1-2) was respectively replaced with the pigments as shown in Table 1.

The electrophotographic photosensitive members thus prepared were negatively charged by corona discharge under −5 kV using an electrostatic copy paper test machine (Model SP-428, manufactured by Kawaguchi Denki K.K.), and then kept in the dark for 1 second, followed by exposure to light with illuminance of 10 lux using a halogen lamp to examine their charge characteristics.

Measured as the charge characteristics were the surface potential ($V_0$) and the amount of exposure ($E_{\frac{1}{2}}$) required for decaying to ½ the surface potential after allowing the photosensitive member to stand in the dark place. Results obtained are shown in Table 1.

TABLE 1

| Example | Exemplary pigment | $V_O(-V)$ | $E_{\frac{1}{2}}$ (lux · sec) |
|---|---|---|---|
| 1 | (1-2) | 690 | 2.6 |
| 2 | (1-3) | 700 | 2.4 |
| 3 | (1-4) | 705 | 2.9 |
| 4 | (1-5) | 710 | 2.7 |
| 5 | (1-6) | 695 | 3.6 |
| 6 | (1-7) | 705 | 2.4 |
| 7 | (2-2) | 705 | 3.3 |
| 8 | (2-3) | 700 | 2.8 |
| 9 | (2-5) | 695 | 3.1 |
| 10 | (3-2) | 695 | 2.0 |
| 11 | (3-3) | 705 | 4.8 |
| 12 | (3-4) | 690 | 3.7 |
| 13 | (4-2) | 710 | 3.6 |
| 14 | (4-4) | 705 | 2.8 |
| 15 | (4-5) | 700 | 2.3 |
| 16 | (4-6) | 705 | 2.1 |
| 17 | (4-7) | 710 | 2.5 |
| 18 | (4-8) | 705 | 3.3 |
| 19 | (5-1) | 695 | 4.1 |
| 20 | (5-2) | 695 | 3.9 |
| 21 | (6-1) | 690 | 3.1 |
| 22 | (6-2) | 695 | 2.9 |
| 23 | (6-3) | 710 | 3.2 |
| 24 | (6-4) | 705 | 3.8 |
| 25 | (6-5) | 700 | 4.1 |
| 26 | (7-1) | 705 | 3.2 |
| 27 | (7-2) | 710 | 3.1 |
| 28 | (7-3) | 705 | 3.4 |
| 29 | (8-1) | 700 | 4.4 |
| 30 | (8-2) | 695 | 3.0 |
| 31 | (8-3) | 695 | 3.9 |
| 32 | (9-1) | 710 | 5.2 |
| 33 | (9-2) | 705 | 4.7 |
| 34 | (9-3) | 700 | 3.0 |
| 35 | (9-4) | 705 | 3.2 |

TABLE 1-continued

| Example | Exemplary pigment | $V_O(-V)$ | $E_{\frac{1}{2}}$ (lux · sec) |
|---|---|---|---|
| 36 | (9-5) | 700 | 4.1 |
| 37 | (10-1) | 695 | 2.8 |
| 38 | (10-2) | 715 | 3.0 |
| 39 | (11-1) | 705 | 2.4 |
| 40 | (11-2) | 695 | 2.7 |
| 41 | (11-4) | 690 | 3.6 |
| 42 | (11-5) | 700 | 2.6 |
| 43 | (11-6) | 710 | 3.4 |
| 44 | (11-7) | 705 | 2.5 |
| 45 | (11-8) | 705 | 2.4 |
| 46 | (12-2) | 695 | 3.2 |
| 47 | (12-3) | 700 | 2.8 |
| 48 | (13-2) | 705 | 2.1 |
| 49 | (13-3) | 695 | 4.6 |
| 50 | (13-4) | 700 | 3.6 |
| 51 | (14-1) | 700 | 2.4 |
| 52 | (14-2) | 705 | 2.2 |
| 53 | (14-4) | 705 | 3.5 |
| 54 | (14-6) | 700 | 2.2 |
| 55 | (14-9) | 710 | 3.4 |
| 56 | (14-10) | 710 | 2.3 |
| 57 | (15-1) | 695 | 4.1 |
| 58 | (15-2) | 695 | 3.8 |

COMPARATIVE EXAMPLES 1 AND 2

Electrophotographic photosensitive members were prepared in the same manner as in Example 1 except that comparative pigments with the following structural formula were respectively used. Charge characteristics were evaluated in the same manner as in Example 1. The respective electrophotographic photosensitive members are designated as Comparative Examples 1 and 2. Results obtained are shown in Table 2.

TABLE 2

| Comparative example | Comparative pigment | $V_O(-V)$ | $E_{\frac{1}{2}}$ (lux · sec) |
|---|---|---|---|
| 1 | (1) | 700 | 6.2 |
| 2 | (2) | 680 | 7.4 |

EXAMPLES 59 TO 67

Using the electrophotographic photosensitive members prepared in Examples 1, 2, 3, 21, 22, 23, 39, 40 and 41, the variations of the dark portion potential and the light portion potential were measured when the photosensitive members were repeatedly used.

To carry out the measurement, the electrophotographic photosensitive members of the present invention were each stuck on a cylinder of an electrophotographic copying machine equipped with a corona charger of −6.5 kV, an exposure optical system, a developing assembly, a transfer charger, a charge elimination exposure optical system and a cleaner.

This copying machine is so constructed that images can be obtained on transfer sheets as the cylinder is driven.

Using this copying machine, the dark portion potential $V_D$ and light portion potential $V_L$ at the initial stage were set to be approximately −700 V and −200 V, respectively, and the amount of variation of dark portion potential $\Delta V_D$ and the amount of variation of light portion potential $\Delta V_L$ were measured after the respective photosensitive members were repeatedly used 5,000 times. Results obtained are shown in Table 3.

The minus sign in the amount of variation of potential represents a decrease in the absolute value of the potential, and the positive sign represents an increase in the absolute value of the potential.

Comparative pigment (1)

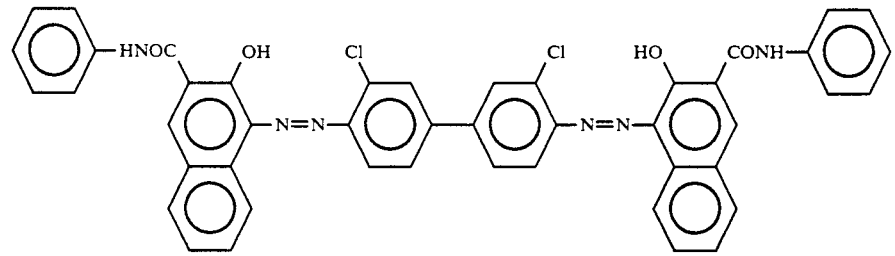

Comparative pigment (2)

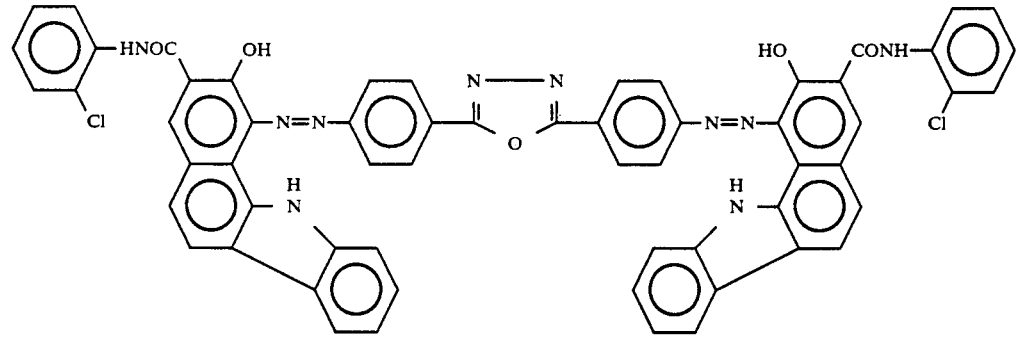

TABLE 3

| Example | Exemplary pigment | $\Delta V_D$ (V) | $\Delta V_L$ (V) |
|---|---|---|---|
| 59 | (1-2) | −10 | +20 |

TABLE 3-continued

| Example | Exemplary pigment | $\Delta V_D$ (V) | $\Delta V_L$ (V) |
|---|---|---|---|
| 60 | (1-3) | −15 | +15 |
| 61 | (1-4) | −20 | +15 |
| 62 | (6-1) | −20 | +25 |
| 63 | (6-2) | −15 | +10 |
| 64 | (6-3) | −25 | +10 |
| 65 | (11-1) | −15 | +15 |
| 66 | (11-2) | −15 | +20 |
| 67 | (11-4) | −20 | +15 |

COMPARATIVE EXAMPLES 3 AND 4

Using the electrophotographic photosensitive members prepared in Comparative Examples 1 and 2, the amount of variation of potential was measured in the same manner as in Example 59 after they were repeatedly used. Results obtained are shown in Table 4.

TABLE 4

| Comparative example | Comparative pigment | $\Delta V_D$ (V) | $\Delta V_L$ (V) |
|---|---|---|---|
| 3 | (1) | −30 | +70 |
| 4 | (2) | −45 | +65 |

EXAMPLES 68 TO 70

A subbing layer comprising polyvinyl alcohol was formed in a coating thickness of 0.5 μm on the aluminum surface of an aluminum-deposited polyethylene terephthalate film.

A dispersion of the pigment, comprising the exemplary pigment (1-2), used in Example 1 was applied onto the subbing layer by Meyer bar coating, followed by drying to form a charge generation layer of 0.2 μm in coating thickness.

Next, a solution prepared by dissolving 5 g of a styryl compound with the following structural formula:

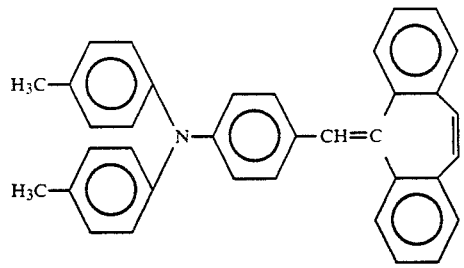

and 5 g of polycarbonate (number average molecular weight: 55,000) in 40 ml of tetrahydrofuran was applied onto the charge generation layer, followed by drying to form a charge transport layer of 20 μm in coating thickness.

Electrophotographic photosensitive members were also prepared in the same manner as the above except for using the exemplary pigments (6-3) and (11-1), respectively.

The charge characteristics and durability characteristics of the electrophotographic photosensitive members thus prepared were evaluated in the same manners as in Examples 1 and 59. Results obtained are shown in Table 5.

TABLE 5

| Example | Exemplary pigment | $V_O$ (−V) | $E_{\frac{1}{2}}$ (lux·sec) | $\Delta V_D$ (V) | $\Delta V_L$ (V) |
|---|---|---|---|---|---|
| 68 | (1-2) | 700 | 2.8 | −10 | −25 |
| 69 | (6-3) | 690 | 3.5 | −5 | +20 |
| 70 | (11-1) | 705 | 2.6 | −10 | +20 |

EXAMPLES 71 TO 73

Electrophotographic photosensitive members were prepared by coating in the reverse order the charge generation layer and charge transport layer in each of the electrophotographic photosensitive members prepared in Examples 68, 69 and 70. The charge characteristics of each photosensitive member were evaluated in the same manner as in Example 1. Here, the photosensitive members were positively charged.

Results obtained are shown in Table 6.

TABLE 6

| Example | Exemplary pigment | $V_O$ (V) | $E_{\frac{1}{2}}$ (lux·sec) |
|---|---|---|---|
| 71 | 1-2 | 680 | 6.2 |
| 72 | 6-3 | 695 | 6.2 |
| 73 | 11-1 | 680 | 5.2 |

EXAMPLES 74 TO 76

Onto the charge generation layers prepared in Examples 1, 35 and 39 each, a coating solution prepared by dissolving 5 g of 2,4,7-trinitro-9-fluorenone and 5 g of poly-4,4'-dioxydiphenyl-2,2-propane carbonate (number average molecular weight: 30,000) in 50 ml of tetrahydrofuran was applied so as to have a dry coating thickness of 18 μm, followed by drying to form a charge transport layer.

The charge characteristics of the electrophotographic photosensitive members thus prepared were measured in the same manner as in Example 1. Here, the photosensitive members were positively charged. Results obtained are shown in Table 7.

TABLE 7

| Example | Exemplary pigment | $V_O$ (−V) | $E_{\frac{1}{2}}$ (lux·sec) |
|---|---|---|---|
| 74 | (1-2) | 685 | 6.2 |
| 75 | (9-4) | 700 | 5.1 |
| 76 | (11-1) | 695 | 6.0 |

EXAMPLES 77 TO 79

Using a paint shaker, 0.5 g of the exemplary pigment (4-2) was dispersed for 5 hours together with 9.5 g of cyclohexanone. A solution obtained by dissolving 5 g of the charge-transporting material as used in Example 1 and 5 g of polycarbonate in 40 g of tetrahydrofuran was added thereto, followed by shaking for further 1 hour. A coating solution thus prepared was applied to an aluminum support by Meyer bar coating to form a photosensitive layer of 20 μm in coating thickness.

The charge characteristics of an electrophotographic photosensitive member thus prepared were evaluated in the same manner as in Example 1. Here, the photosensitive member was positively charged.

Photosensitive members were prepared in the same way except that the exemplary pigment (4-2) was replaced with exemplary pigments (8-2) and (14-2), respectively. Evaluation was made similarly.

Results obtained are shown in Table 8.

TABLE 8

| Example | Exemplary pigment | $V_O$ (V) | $E_{\frac{1}{2}}$ (lux · sec) |
|---------|-------------------|-----------|-------------------------------|
| 77 | (4-2) | 705 | 4.3 |
| 78 | (8-2) | 705 | 4.9 |
| 79 | (14-2) | 705 | 4.6 |

We claim:

1. An electrophotographic photosensitive member comprising a conductive support and a photosensitive layer provided on said conductive support, wherein said photosensitive layer contains an azo pigment as a charge-generating material represented by the following Formula (1), Formula:

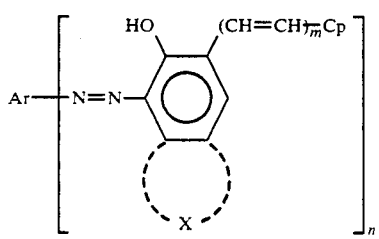 (1)

wherein Ar represents an aromatic hydrocarbon group which may be bonded through a bonding group and may have a substituent, or a heterocyclic group which may be bonded through a bonding group and may have a substituent; X represents a residual group necessary to complete upon condensation with the benzene ring an aromatic hydrocarbon ring which may have a substituent or an aromatic heterocyclic ring which may have a substituent; Cp represents the following Formula (2), (3) or (4), Formula:

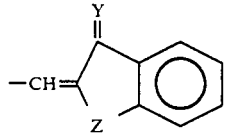 (2)

wherein Y represents an oxygen atom, a sulfur atom or a dicyanomethylene group; and Z represents an imino group, a sulfinyl group or a sulfonyl group, Formula:

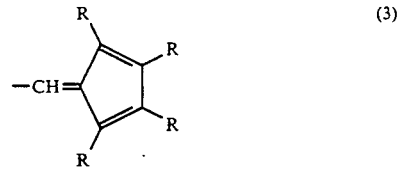 (3)

wherein R represents an alkyl group or an aryl group,

Formula:

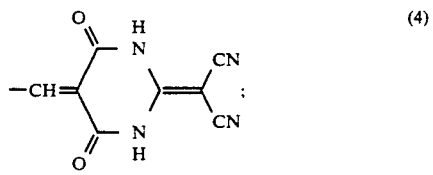 (4)

and m is an integer of 0 or 1, and n is an integer of 1, 2 or 3.

2. An electrophotographic photosensitive member according to claim 1, wherein said photosensitive layer has a charge generation layer and a charge transport layer.

3. An electrophotographic photosensitive member according to claim 2, wherein said charge transport layer is provided on the charge generation layer.

4. An electrophotographic photosensitive member according to claim 2, wherein said charge generation layer is provided on the charge transport layer.

5. An electrophotographic photosensitive member according to claim 1, wherein said photosensitive layer is comprised of a single layer.

6. An electrophotographic photosensitive member according to claim 1, wherein said electrophotographic photosensitive member has a subbing layer between the support and the photosensitive layer.

7. An electrophotographic photosensitive member according to claim 1, wherein said electrophotographic photosensitive member has a protective layer in the photosensitive layer.

* * * * *

UNITED STATES PATENT AND TRADEMARK OFFICE
CERTIFICATE OF CORRECTION

PATENT NO. : 5,158,847
DATED : October 27, 1992
INVENTOR(S) : SHINTETSU GO, ET AL.

It is certified that error appears in the above-identified patent and that said Letters Patent is hereby corrected as shown below:

COLUMN 21

Line 25, "flourine" should read --fluorine--.

COLUMN 31

Line 16, "flourine" should read --fluorine--.

COLUMN 37

Line 53, "alcoholsolu-" should read --alcohol-solu- --.

Signed and Sealed this

Fourteenth Day of December, 1993

Attest:

BRUCE LEHMAN

Attesting Officer       Commissioner of Patents and Trademarks